US009168514B2

(12) United States Patent
Zhou et al.

(10) Patent No.: US 9,168,514 B2
(45) Date of Patent: Oct. 27, 2015

(54) MICROWAVE CATALYST AND PREPARATION PROCESS AND USE THEREOF

(71) Applicant: Xiangtan University, Xiangtan (CN)

(72) Inventors: Jicheng Zhou, Xiangtan (CN); Zhe Wang, Xiangtan (CN); Hongli Wang, Xiangtan (CN); Meng Wang, Xiangtan (CN); Guiyue Mao, Xiangtan (CN); Zunfang Jiang, Xiangtan (CN); Lingfei Gao, Xiangtan (CN)

(73) Assignee: Xiangtan University, Xiangtan (CN)

( * ) Notice: Subject to any disclaimer, the term of this patent is extended or adjusted under 35 U.S.C. 154(b) by 0 days.

(21) Appl. No.: 14/369,242

(22) PCT Filed: Dec. 24, 2012

(86) PCT No.: PCT/CN2012/087347
§ 371 (c)(1),
(2) Date: Jun. 27, 2014

(87) PCT Pub. No.: WO2013/097677
PCT Pub. Date: Jul. 4, 2013

(65) Prior Publication Data
US 2015/0010455 A1    Jan. 8, 2015

(30) Foreign Application Priority Data

Dec. 30, 2011    (CN) .......................... 2011 1 0451118
Dec. 30, 2011    (CN) .......................... 2011 1 0451192

(51) Int. Cl.
| | | |
|---|---|---|
| *B01J 29/70* | (2006.01) | |
| *B01J 29/46* | (2006.01) | |
| *B01J 29/14* | (2006.01) | |
| *B01J 23/34* | (2006.01) | |
| *B01J 23/745* | (2006.01) | |
| *B01D 53/56* | (2006.01) | |
| *B01J 23/72* | (2006.01) | |
| *B01D 53/00* | (2006.01) | |
| *B01D 53/86* | (2006.01) | |
| *B01J 37/03* | (2006.01) | |
| *B01J 21/18* | (2006.01) | |
| *B01J 23/00* | (2006.01) | |
| *B01J 29/76* | (2006.01) | |

(52) U.S. Cl.
CPC ........... *B01J 29/7007* (2013.01); *B01D 53/007* (2013.01); *B01D 53/8628* (2013.01); *B01D 53/8631* (2013.01); *B01J 21/18* (2013.01); *B01J 23/005* (2013.01); *B01J 23/34* (2013.01); *B01J 23/72* (2013.01); *B01J 23/745* (2013.01); *B01J 29/146* (2013.01); *B01J 29/46* (2013.01); *B01J 29/7615* (2013.01); *B01J 37/031* (2013.01); *B01D 2255/2047* (2013.01); *B01D 2255/2065* (2013.01); *B01D 2255/2073* (2013.01); *B01D 2255/20707* (2013.01); *B01D 2255/20715* (2013.01); *B01D 2255/20723* (2013.01); *B01D 2255/20761* (2013.01); *B01D 2255/407* (2013.01); *B01D 2255/504* (2013.01); *B01D 2259/806* (2013.01)

(58) Field of Classification Search
CPC ................. B01D 2255/2065; B01D 2255/504; B01D 2255/2047; B01D 2255/20715; B01D 2255/2073; B01D 53/8631; B01D 53/007; B01J 29/7615; B01J 29/146; B01J 29/46; B01J 23/005; B01J 23/72; B01J 23/745
See application file for complete search history.

(56) References Cited

U.S. PATENT DOCUMENTS

| | | | | |
|---|---|---|---|---|
| 4,962,075 | A | * | 10/1990 | Green et al. ..................... 502/71 |
| 5,583,081 | A | * | 12/1996 | Price et al. ....................... 502/61 |
| 6,284,202 | B1 | * | 9/2001 | Cha et al. ...................... 422/186 |
| 2002/0189928 | A1 | * | 12/2002 | Cha ........................... 204/157.3 |
| 2003/0066285 | A1 | * | 4/2003 | Raybone et al. ................ 60/275 |
| 2014/0294706 | A1 | * | 10/2014 | Stakheev et al. ........... 423/213.2 |

FOREIGN PATENT DOCUMENTS

| | | | | |
|---|---|---|---|---|
| CN | 1330975 | A | | 1/2002 |
| CN | 1441153 | A * | 9/2003 | ............. B01D 53/94 |
| CN | 1824371 | A | | 8/2006 |
| CN | 101972603 | A | | 2/2011 |
| CN | 102029178 | A | | 4/2011 |
| CN | 102407113 | A | | 4/2012 |
| CN | 102407114 | A | | 4/2012 |
| JP | 2005127245 | A | | 9/2003 |
| WO | WO 2006083827 | A2 * | 8/2006 | ............. B03C 11/00 |

OTHER PUBLICATIONS

International Search Report issued in priority application No. PCT/CN2012/087347 dated Mar. 28, 2013.
Li, Bintai et al. Mechanism and Advance of Ferrite Absorber. Bulletin of the Chinese Ceramic Society, 2004.
Machine Translation by LexisNexis Total Patent on Jun. 25, 2014 for CN101972603A.
Machine Translation by LexisNexis Total Patent on Jun. 25, 2014 for CN102029178A.
Machine Translation by LexisNexis Total Patent on Jun. 25, 2014 for CN102407113A.
Machine Translation by LexisNexis Total Patent on Jun. 25, 2014 for CN102407114A.
Machine Translation by LexisNexis Total Patent on Jun. 25, 2014 for CN1330975A.
Machine Translation by LexisNexis Total Patent on Jun. 25, 2014 for CN1824371A.
Machine Translation by LexisNexis Total Patent on Jun. 25, 2014 for JP2005127245A.

* cited by examiner

*Primary Examiner* — Timothy Vanoy
(74) *Attorney, Agent, or Firm* — Woodard, Emhardt, Moriarty, McNett & Henry LLP

(57) ABSTRACT

Provided is a microwave catalyst. The microwave catalyst comprises: i) an active catalyst component comprising a metal and/or a metal oxide; ii) a microwave-absorbing component comprising at least one of CuO, ferrite spinel, and active carbon; and iii) a support. The microwave catalyst can be used for denitration by microwave catalysis, and has advantages such as high denitration efficiency, low energy consumption, environmental friendliness, and low costs. Also provided is a process for preparing the microwave catalyst and the use thereof.

15 Claims, No Drawings

MICROWAVE CATALYST AND PREPARATION PROCESS AND USE THEREOF

CROSS REFERENCE TO RELATED APPLICATIONS

This application is a nationalization under 35 U.S.C. 371 of PCT/CN2012/087347, filed Dec. 24, 2012, and published as WO 2013/097677 on Jul. 4, 2013, which application claims priority to and the benefit of Chinese Patent Application No. 201110451118.2, filed Dec. 30, 2011, and which application claims priority to and the benefit of Chinese Patent Application No. 201110451192.4, filed Dec. 30, 2011, which applications and publication are incorporated herein by reference in their entirety.

FIELD OF THE INVENTION

The present disclosure relates to the field of catalyst technology, in particular to a microwave catalyst and a process for preparing the same.

BACKGROUND OF THE INVENTION

With the development of China's economy, energy consumption, especially fossil energy consumption increases significantly. Correspondingly, air pollution is increasingly aggravated. The energy structure based on coal is the main factor that affects the air environment quality of China. Currently, more than 95% of heat-engine plants in China base on coal-burning, the reality of which is difficult to be changed in a short time. Sulfur dioxide, carbon dioxide, nitrogen oxides, and dust that are discharged during the process of coal-burning respectively account for 87%, 71%, 67%, and 60% of the emissions in China, wherein dust has been well controlled and manaeed, and the technology of flue gas desulfurization is increasingly mature, with the projects of flue gas desulfurization being operated in process orderly. However, nitrogen oxides pollution has not yet been effectively controlled. The "12$^{th}$ Five-Year" is an important period for China's economic development, and also a critical period for control of nitrogen oxides. How to take efficient denitration measures to eliminate nitrogen oxide pollution has become an important environmental issue. The technology currently used in the industry is the $NH_3$-SCR method that adopts selective catalytic reduction technology, wherein ammonia is used as the reducing agent. The $NH_3$-SCR method is one of the maturest methods of nitrogen oxides processing technology in the prior art, which enables a nitrogen oxide removal rate of 80% to 90% at a low temperature. However, the method has shortcomings such as great consumption of reducing agents, the catalyst being susceptible to poisoning, high requirements on the pipeline equipments, and insufficiently high denitration efficiency.

In chemical reactions, microwave can directly interact with chemical systems to promote the processes of various chemical reactions. Microwave has not only thermal effects, but also special non-thermal effects. Since Harwell laboratory successfully disposed nuclear wastes by using microwave technology, not only microwave technology has been widely used in many fields of study such as organic chemistry, inorganic material chemistry, and analytical chemistry, but the new field of microwave chemistry also has been gradually developed. Extensive literature has reported the use of microwave technology in chemical reactions, and thus research in the field is a hot topic at present. In recent years, many researchers attempt to use microwave-heating in the process of heterogeneous catalytic reactions, wherein the use of microwave also shows a good effect.

In addition, since it was discovered that the copper ion-exchange-type ZSM-5 molecular sieve catalyst can directly catalyze $NO_x$ decomposition, the Cu/ZSM-5 catalyst has been considered as the denitration catalyst having the greatest industrial application prospect due to its high catalytic activity and stability. It is generally believed that, in the directly catalytic decomposition of NO using Cu/ZSM-5 as the catalyst, the activation of NO is mainly carried out on Cu species, and the intermediate formed after activation generates products such as nitrogen and oxygen under the combined action of the acid sites of the catalyst. According to the gas-solid catalytic reaction mechanism, the surface bonding capacity of a solid catalyst, i.e. the absorption capacity of activated reaction molecules, is strongly dependent on the surface and its morphology characteristics, and the Cu species distributed on the external surface of the molecular sieve may be more favorable to the activation of NO.

Previous experimental results indicate that, after high temperature calcinations, the catalyst prepared by ion exchange has quite a part of Cu species migrating into the pores of the molecule sieve. In order to investigate the effect of the Cu species on the external surface of the molecule sieve on the catalytic decomposition of NO, as well as the structure-activity relationship between the surface microstructure and chemical properties of the catalyst, and the catalytic performance, and to disperse the Cu species on the external surface as many as possible, the catalyst is prepared by the microwave solid-phase method and the solid-phase dispersion method. The solid-phase dispersion method prepares a catalyst based on the principle that metal salts or metal oxides disperse spontaneously on a carrier of a large specific surface area. Due to the impact of the migration of metal ions and the like, a solid ion exchange reaction requires to be initiated by heating after mechanical mixing. As the temperature required is high, and the reaction time is long, the distribution of the metal components on the external and internal surfaces of the molecular sieve is difficult to be controlled effectively. Since microwave is a non-ionizing electromagnetic energy, microwave-heating has features such as a fast and special electromagnetic effect, a non-destructive effect to the material to be heated, and so on. Therefore, using the way of microwave-heating can improve the heating speed as well as control the distribution of metal components on the external and internal surfaces of the molecular sieve. During the last 20 years, scientists of different countries have conducted extensive research into the Cu/ZSM-5 catalyst. There are also reports about the location of the Cu species on the Cu/ZSM-5 catalyst and the influence of different existing forms on the catalytic activity for NO decomposition. The highest conversion rate of NO in decomposition thereof using the Cu/ZSM-5 catalyst is 70%. The deficiencies thereof are low conversion rate of the Cu/ZSM-5 catalyst, and low denitration efficiency, failing to meet the requirements for emissions.

SUMMARY OF THE INVENTION

To overcome the defects in the prior art, the present disclosure provides a microwave catalyst and a use thereof in denitration reactions. The present disclosure further provides a copper molecular sieve catalyst and a use thereof in denitration reactions. When used in denitration reactions, the microwave catalyst provided by the present disclosure is favorable for high conversion rate, environmental protection, and low-costs.

A microwave catalyst comprises:

i) an active catalyst component, comprising a metal and/or a metal oxide;

ii) a microwave-absorbing component, comprising at least one of CuO, ferrite spinel, and active carbon; and iii) a support.

Typically, the ingredient of the ferrite spinel is $MgFeO_4$.

In the components of the present disclosure, component i) is the active reaction center of the catalyst; component ii) is the microwave-absorbing component, which is to absorb microwave for raising the temperature and to decrease the reaction activation energy after interaction with microwave, so as to enable the catalytic reaction a better catalytic effect at a lower temperature; and component iii), as the support, can also play the role of partly absorbing microwave.

In the microwave catalyst of the present disclosure, the metal is at least one selected from the group consisting of Cu, Mn, Ce, Ti, V, Mg, and Fe, preferably Cu: and the metal oxide is at least one oxide selected from the oxides of Cu, Mn, Ce, Ti, V, Mg, and Fe, preferably CuO.

The support has a porous structure capable of absorbing microwave. Preferably, the support is active carbon and/or a molecular sieve.

The molecular sieve can be a ZSM type molecular sieve, a Y-type molecular sieve, or a β-type molecular sieve, preferably a ZSM-5 molecular sieve.

The catalyst preferably contains Cu-ZSM-5 or Cu—Y.

When the catalyst contains Cu-ZSM-5, the content of Cu in Cu-ZSM-5 accounts for 2% to 12% by mass the content of the ZSM-5 molecular sieve.

When the catalyst contains Cu—Y, the content of Cu in Cu—Y accounts for 2% to 12% by mass the content of the Y-type molecular sieve.

The content of component i) in the microwave catalyst is in the range from 10% to 70% by mass.

The content of CuO as component ii) of the microwave catalyst is in the range from 1% to 35% by mass, preferably from 30% to 45% by mass.

The content of active carbon as component ii) of the microwave catalyst is in the range from 5% to 35% by mass, preferably from 15% to 30% by mass.

The present disclosure further provides a process for preparing the microwave catalyst, comprising preparing a support loaded with an active component with components i) and iii) by using the ion exchange method, solid-phase dispersion method, or microwave solid-phase method; and preparing the microwave catalyst with the support loaded with an active component and component ii) by precipitation or co-precipitation.

The present disclosure further provides a process for removing NO by microwave catalysis using the above-mentioned microwave catalyst, which comprises filling the microwave catalyst into the microwave reactor of a microwave device to form a microwave catalytic reaction bed; and allowing the gas to be processed to pass through the microwave catalytic reaction bed, with a retention time in the range from 0.2 sec to 5 sec, preferably 1.5 sec to 4 sec, and at a reaction temperature in the range from of 150° C. to 600° C., so as to enable a gas-solid reaction between the gas to be processed and the microwave catalyst, and thereby the nitrogen oxide can be converted into N. In this way, the nitrogen oxide of the gas to be processed is removed.

The beneficial effects of the present disclosure are as follows.

The present disclosure provides a microwave catalyst which has the following advantages.

1) Since the component of absorbing microwave is used to reduce the reaction activation energy, the microwave catalytic reaction can exhibit a higher catalytic efficiency at a lower temperature.

2) When it is used as the catalyst for removing nitrogen oxides, the removal rate can reach more than 99%. Compared with the prior art, the catalyst has the advantages such as high conversion rate, low energy consumption, environmental friendliness, and low costs.

DETAILED DESCRIPTION OF THE EMBODIMENTS

The present disclosure will be further explained in connection with drawings and specific examples, whereby it will be fully understood and therefore can be implemented as to how the present disclosure solves the technical problems by using the technical means as well as achieves the technical effects. It should be noted that, as long as there are no conflicts, the technical features disclosed in each and every embodiment of the present disclosure can be combined with one another in any way, and all technical solutions formed are within the scope of the present disclosure.

Molecular Sieve Based Catalysts and Process for Preparing the Same

EXAMPLE 1

The microwave catalyst of the example comprises: i) metal Cu as an active component of the catalyst; ii) CuO as a microwave-absorbing component; and iii) ZSM molecular sieve as a support.

Said Cu exists in Cu-ZSM-5 in the form of ions, and the content of Cu as the active component is 5% by mass the content of Cu-ZSM-5. The content of CuO accounts for 40% by mass the content of the microwave catalyst.

The process for preparing the above microwave catalyst is as follows. A support Cu-ZSM-5 loaded with the active component is prepared with components i) and iii) by ion exchange, followed by homogeneous mixing of the support loaded with the active component and component ii) to obtain the microwave catalyst CuO—Cu-ZSM-5.

EXAMPLE 2

The microwave catalyst of this example comprises: i) metal Mn as an active component of the catalyst; ii) active carbon as a microwave-absorbing component; and iii) active carbon as a support.

In addition, the content of Mn accounts for 3% by mass the content of the microwave catalyst.

The process for preparing the above microwave catalyst is as follows. A support Mn AC loaded with the active component is prepared with components i) and iii) by solid-phase dispersion, followed by homogeneous mixing of the support loaded with the active component and component ii) to obtain the microwave catalyst Mn-AC.

EXAMPLE 3

The microwave catalyst of this example comprises: i) metal Cu as an active component of the catalyst; ii) active carbon as a microwave-absorbing component; and iii) ZSM molecule sieve as a support.

Said Cu exists in Cu-ZSM-5 in the form of ions, and the content of Cu as the active component is 5% by mass the content of Cu-ZSM-5. The content of the active carbon in the microwave catalyst is 30% by mass the content of the microwave catalyst.

The process for preparing the above microwave catalyst is as follows. A support Cu-ZSM-5 loaded with the active component is prepared with components i) and iii) by the microwave solid-phase method, followed by homogeneous mixing of the support loaded with the active component and component ii) to obtain the microwave catalyst AC-Cu-ZSM-5.

EXAMPLE 4

The microwave catalyst of this example comprises: i) ferrite spinel as both an active component and a support of the catalyst; and ii) active carbon as a microwave-absorbing component. The content of the ferrite spinel accounts for 70% by mass the content of the microwave catalyst. The content of the active carbon in the microwave catalyst is 30% by mass the content of the microwave catalyst.

The process for preparing the above microwave catalyst is as follows. A support loaded with the active component is prepared with components i) and iii) by ion exchange, followed by homogeneous mixing of the support loaded with the active component and component to obtain the microwave catalyst.

EXAMPLE 5

The microwave catalyst of this example comprises: i) both metal Cu and CuO as active components of the catalyst; ii) active carbon as a microwave-absorbing component; and iii) ZSM molecule sieve as a support.

Said Cu exists in Cu-ZSM-5 in the form of ions, and the content of Cu as the active component accounts for 5% by mass the content of Cu-ZSM-5. The content of CuO, and the content of the active carbon account for 25% by mass, 30% by mass the content of the microwave catalyst, respectively.

The process for preparing the above microwave catalyst is as follows. A support Cu-ZSM-5 loaded with the active component is prepared from components i) and iii) by ion exchange, followed by homogeneous mixing of the support loaded with the active component and component ii) to obtain the microwave catalyst.

The content of Cu in the Cu-ZSM-5 is in the range from 2% to 12% by mass, preferably from 3% to 8% by mass, wherein, the ZSM molecular sieve has porous structures capable of absorbing microwave.

EXAMPLE 6

The microwave catalyst of this example comprises: i) metal Cu as an active component of the catalyst; ii) active carbon as a microwave-absorbing component; and iii) a Y-type molecular sieve as a support.

Said Cu exists in Cu—Y in the form of ions, and the content of Cu accounts for 5% by mass the content of the Y-type molecular sieve. The content of active carbon is 30% by mass the content of the microwave catalyst.

The process for preparing the above microwave catalyst is as follows. A support Cu—Y loaded with the active component is prepared from components i) and iii) by microwave solid-phase reaction, followed by homogeneous mixing of the support loaded with the active component and component ii) to obtain the microwave catalyst AC-Cu—Y.

EXAMPLE 7

The microwave catalyst of this example comprises: i) metal Cu as an active component of the catalyst; ii) CuO as a microwave-absorbing component; and iii) a β-type molecular sieve as a support.

Said Cu exists in Cu-β in the form of ions, and the content of Cu accounts for 5% by mass the content of the β-type molecular sieve. The content of CuO accounts for 35% by mass the content of the microwave catalyst.

The process for preparing the above microwave catalyst is as follows. A support Cu—P loaded with the active component is prepared with components i) and iii) by ion exchange, followed by homogeneous mixing of the support loaded with the active component and component ii) to obtain the microwave catalyst CuO—Cu-β.

Use of the Catalyst of the Present Disclosure in Removal of Nitrogen Oxides

The catalyst is filled into a microwave reaction tube of a microwave device to form a microwave catalytic reaction bed. When the gas to be processed is allowed to pass through the microwave catalytic reaction bed, a gas-solid reaction occurs between the gas to be processed and the microwave catalyst, wherein the reaction temperature is in the range from 150° C. to 600 and the retention time is in the range from 0.2 sec to 5 sec. Thus, the nitrogen oxides in the gas to be processed are removed by the microwave catalyst.

The gas to be processed mentioned in the present disclosure is a mixed gas composed of N2 and NO supplied by Dalian great special gas co., LTD, wherein the concentration of NO is 1000 ppm.

The Gas analyzer used is 42C NO—$NO_2$—$NO_x$ Analyzer manufactured in the US.

The power of the microwave filed is continuously adjustable in the range from 0 w to 1000 w, and the frequency is in the range from 2400 MHz to 2500 MHz. The quartz reactor is WG1/2.45–φ5.4×54. The quartz tube used in the examples has a length of 535 mm and an inner diameter of 10 mm.

EXAMPLE 8

The filling amount of the catalyst is 5 g of CuO—Cu-ZSM-5, in which the amount of Cu-ZSM-5 is 3 g and the amount of CuO is 2 g. The content of Cu in Cu-ZSM-5 is 5% by mass, and the content of Cu in CuO—Cu-ZSM-5 is 40% by mass. Automatic control of the microwave power is used to enable the temperatures of the catalyst bed to be 180° C. and 380° C., respectively, and the reaction pressure is the atmospheric pressure. The NO has a content of 1000 ppm, and conversion rates of 87.60%, 97.95%, and 98.93%, respectively. After processing, the exhaust gas/waste gas could meet the national standards of effluent discharge. The effects of the catalyst are shown in Table 1.

TABLE 1

Effects of the temperatures of the reaction bed on conversion rates of NO

| Catalyst | Temperature of the reaction bed (° C.) | Conversion rate of NO (%) |
|---|---|---|
| 3 g of Cu-ZSM-5 + 2 g of CuO | 180 | 87.60 |
| | 300 | 97.95 |
| | 380 | 98.93 |
| | 450 | 88.99 |

EXAMPLE 9

AC Represents Active Carbon

The catalyst Mn—Ac prepared by loading metal Mn on active carbon is filled into a quartz reaction tube, in which a gas-solid reaction occurs under the action of the microwave field and microwave energy. The exhaust gas/waste gas is allowed to pass through the microwave catalyst bed filled with the Mn—Ac catalyst in the quartz reaction tube, wherein the microwave catalytic reduction reaction occurs and NO is reduced to $N_2$. Therefore, the aim of removal of NO can be achieved. The results of NO microwave catalytic reduction using the Mn/AC catalyst are shown in Table 2.

TABLE 2

Effects of the temperatures of the reaction bed on conversion rates of NO

| Number | Temperature of the reaction bed | Conversion rate of the 3% of Mn/Ac catalyst |
|---|---|---|
| 1 | 250° C. | 76.96% |
| 2 | 300° C. | 84.08% |
| 3 | 350° C. | 91.03% |
| 4 | 380° C. | 99.12% |
| 5 | 400° C. | 99.65% |

Conditions: the filling amount of the catalyst is 10 ml; the NO has a concentration of 1000 ppm in the gas inlet; a flow of 160 ml/min, and a space velocity of 102 $h^{-1}$; and the oxygen has a flow of 10 ml/min, and a content of 5.88% by mass the content of the gas.

NO can be catalytically reduced in a certain range by the denitration process using the microwave catalyst, and thus the aim of removing $NO_x$ can be achieved. When the temperature of the reaction bed is in the range from 380° C. to 400° C., and the content of NO is 1000 ppm, the conversion rate can he higher than 99%.

EXAMPLE 12

A microwave catalytic reactor is filled with the AC-Cu-ZSM-5 catalyst comprising the Cu-ZSM-5 catalyst with the content of Cu as 5%, and 30% by mass of AC, both of which catalyze the conversion reaction of NO under the action of microwave. The Cu-ZSM-5 catalyst is used for denitration as a catalyst, while the AC is used as a catalyst as well as a reducing agent for denitration. Two microwave catalytic denitration processes are simultaneously performed in the reactor, so that the denitration rate is high and the removal rate of NO can he higher than 99%.

Conditions: the filling amount of the catalyst is 10 ml; the gas flow is 160 ml/min, the content of NO in the gas is 1000 ppm; and the flow of oxygen is 12 ml/min.

TABLE 3

Effects of changing the microwave power on removal of NO by using 30% of AC + 5% of Cu-ZSM-5

| Number | Microwave power (W) | Balanced temperature of the catalyst bed (° C.) | NO content of the outlet (ppm) | Conversion rate (%) |
|---|---|---|---|---|
| 1 | 300 | 220 | 99.1 | 90.09 |
| 2 | 500 | 300 | 22.3 | 97.77 |
| 3 | 800 | 580 | 3.59 | 99.64 |

The conclusion is that the conversion rate of NO improves as the microwave power increases. NO can be catalytically reduced in a certain range by the denitration process using microwave catalyst, and thus the aim of removing $NO_x$ can be achieved. When the temperature of the reaction bed is in the range from 300° C. to 580° C., and the content of NO in the gas is 1000 ppm, the conversion rate can reach higher than 97%.

EXAMPLE 13

The catalyst filled is 5 g of CuO—Cu-ZSM-5, wherein the content of Cu in Cu-ZSM-5 is 5% by mass, and the content of CuO in CuO—Cu-ZSM-5 is 40% by mass. Automatic control of the microwave power is used so as to enable the temperatures of the catalyst bed to be respectively at 180° C., 300° C., and 380° C., and the reaction pressure is the atmospheric pressure. The tests of removal of NO by microwave catalysis are carried out, and the reaction results at different temperatures are shown in Table 7.

TABLE 7

Reaction results at different temperatures of the catalyst bed

| Catalyst | Temperature of the catalyst bed (° C.) | Conversion rate of NO (%) |
|---|---|---|
| CaO—Cu-ZSM-5 | 180 | 87.60 |
| | 300 | 97.95 |
| | 380 | 98.93 |

In the case that the temperature of the catalyst bed is 380° C., the CuO—Cu/ZSM-5 has a surprising effect in decomposing NO in the microwave reactor. The conversion rate of NO reaches 98.93%.

EXAMPLE 14

The catalyst filled is 5 g of CuO—Cu-ZSM-11, wherein the content of Cu in Cu-ZSM-11 is 5% by mass, and the content of CuO in CuO—Cu-ZSM-11 is 40% by mass. Automatic control of the microwave power is used to enable the temperatures of the catalyst bed to be respectively at 180° C., 300° C., and 380° C., and the reaction pressure is the atmospheric pressure. The tests of removal of NO by microwave catalysis are carried out, and the reaction results at different temperatures are shown in Table 8.

TABLE 8

Reaction results at different temperatures of the catalyst bed

| Catalyst | Temperature of the catalyst bed (° C.) | Conversion rate of NO (%) |
|---|---|---|
| CuO—Cu-ZSM-11 | 180 | 88.10 |
| | 300 | 97.98 |
| | 380 | 99.13 |

In the case that the temperature of the catalyst bed is 380° C., the CuO—Cu-ZSM-11 has a surprising effect in decomposing NO in the microwave reactor. The conversion rate of NO reaches 99.13%.

EXAMPLE 15

The catalyst filled is 5 g of CuO—Cu—Y, wherein the content of Cu in Cu—Y is 5% by mass, and the content of CuO in CuO—Cu—Y is 40% by mass. Automatic control of the microwave power is used to enable the temperatures of the catalyst bed to be respectively at 180° C., 300° C., and 380° C., and the reaction pressure is the atmospheric pressure. The tests of removal of NO by microwave catalysis are carried out, and the reaction results at different temperatures are shown in Table 9.

TABLE 9

Reaction results at different temperatures of the catalyst bed

| catalyst | Temperature of the catalyst bed (° C.) | Conversion rate of NO (%) |
| --- | --- | --- |
| CuO—Cu—Y | 180 | 86.10 |
| | 300 | 96.78 |
| | 380 | 98.76 |

In the case that the temperature of the catalyst bed is 380° C., the CuO—Cu—Y has a surprising effect in decomposing NO in the microwave reactor. The conversion rate of NO reaches 98.76%.

EXAMPLE 16

The catalyst filled is 5 g of CuO—Cu-β, wherein the content of Cu in Cu-β is 5% by mass, and the content of CuO in CuO—Cu-β is 40% by mass. Automatic control of the microwave power is used to enable the temperatures of the catalyst bed to be respectively at 180° C., 300° C., and 380° C., and the reaction pressure is at atmospheric pressure. The tests of removal of NO by microwave catalysis are carried out, and the reaction results at different temperatures are shown in Table 10.

TABLE 10

Reaction results at different temperatures of the catalyst bed

| Catalyst | Temperature of the catalyst bed (° C.) | Conversion rate of NO (%) |
| --- | --- | --- |
| CuO—Cu-β | 180 | 87.12 |
| | 300 | 97.38 |
| | 380 | 98.96 |

In the case that the temperature of the catalyst bed is 380° C., the CuO—Cu-β can decompose NO efficiently in the microwave reactor. The conversion rate of NO reaches 98.96%.

EXAMPLE 17

10 ml of the catalyst is filled, which comprises 30% by mass of active carbon (AC), and Cu-ZSM-5 catalyst with a content of Cu as 5% by mass. The gas flow is 160 ml/min; the content of NO in the gas inlet is 1000 ppm; the oxygen flow is 12 ml/min, and the content of oxygen is 5.88% by mass the content of the gas. The catalyst is tested, and the results are shown in Table 13.

TABLE 13

Effects of microwave power on removal of NO by using 30% of AC + Cu-ZSM-5 with 5% of Cu

| Number | Microwave power (W) | Balanced temperature of the catalyst bed (° C.) | Content of NO at the outlet (ppm) | Conversion rate (%) |
| --- | --- | --- | --- | --- |
| 1 | 300 | 220 | 99.1 | 90.09 |
| 2 | 500 | 300 | 22.3 | 97.77 |
| 3 | 800 | 580 | 3.59 | 99.64 |

The conclusion is that the conversion rate of NO improves as the microwave power increases.

COMPARATIVE EXAMPLE 1

The filling amount of the catalyst (not containing component ii)) using $MgFeSO_4$ as component i) and component iii) is 4 g. The concentration of NO in the gas inlet is 1000 ppm; the flow of the gas is controlled at a rate of 160 ml/min; the content of oxygen is 5.88% by mass the content of the gas. The reaction pressure is at atmospheric pressure.

The test data of directly catalytic decomposition by the catalyst of $MgFeSO_4$ are shown in Table 4.

TABLE 4

Effects of the temperatures of the reaction bed on the conversion rates of NO

| Number | Temperature of the reaction bed (° C.) | Conversion rate of NO (%) |
| --- | --- | --- |
| 1 | 200 | 58.0 |
| 2 | 250 | 64.7 |
| 3 | 300 | 71.9 |
| 4 | 350 | 79.0 |
| 5 | 400 | 79.8 |
| 6 | 420 | 81.7 |

From the results of Comparative Example 1, it can be seen that the catalytic efficiency of the catalyst containing no microwave-absorbing component is lower than that of the catalyst comprising the microwave absorbing component. When the temperature of the reaction bed is up to 420° C., the conversion rate of NO can reach only 81.7%, which is much less than that can be achieved by using the catalyst of the present disclosure.

COMPARATIVE EXAMPLE 2

The filling amount of the catalyst CuO used directly is 4 g. The NO in the gas inlet has a concentration of 1000 ppm; the flow of the gas is 160 ml/min; the content of oxygen is 5.88% by mass the content of the gas. The reaction temperature is at atmospheric pressure. The results are shown in Table 5.

TABLE 5

Effects of the temperatures of the reaction bed on the conversion rates of NO

| Catalyst | Temperature of the reaction bed (° C.) | Conversion rate of NO (%) |
| --- | --- | --- |
| 4 g of CuO | 250 | 45.6 |
| | 300 | 55.1 |
| | 380 | 62.2 |
| | 450 | 69.3 |

From the results of Comparative Example 2, it can be seen that CuO has the effect of absorbing microwave as mentioned above, but has hardly any catalytic activity under conventional heating; although CuO shows the activity of catalytic decomposition of NO under microwave irradiation, it is not a microwave catalyst with excellent performance when individually used as the catalyst under the microwave irradiation. As a result, the best conversion rate of NO thereof is only 69.3%, which is much less than the conversion rate of NO when using the microwave catalyst of the present disclosure.

COMPARATIVE EXAMPLE 3

The catalyst is the Cu-ZSM-5 with a filling amount of 4 g, wherein the content of Cu is 5% by mass. The NO has a concentration of 1000 ppm in the gas inlet; the flow of the gas is 160 ml/min; the content of oxygen is 5.88% by mass the content of the gas. Automatic control of the microwave power is used to enable the temperatures of the catalyst bed to be at 120° C., 150° C., and 180° C. respectively, and the reaction pressure is at atmospheric pressure. The tests of removal of NO by microwave catalysis are carried out, and the reaction results at different temperatures are shown in Table 6.

TABLE 6

Reaction results at different temperatures of the catalyst bed

| Catalyst | Temperature of the catalyst bed (° C.) | Conversion rate of NO (%) |
|---|---|---|
| Cu-ZSM-5 | 120 | 73.0 |
| | 150 | 79.0 |
| | 180 | 82.4 |

Cu-ZSM-5 shows a high performance for the catalytic decomposition of NO under conventional heating. However, without the presence of a microwave-absorbing component, the catalyst of Comparative Example 3 fails to enable an optimal temperature of the catalyst bed for microwave reactions by microwave heating, and the temperature of the catalyst bed can be heated to only 180° C. In addition, even when the catalyst bed has a temperature of 180° C., in the case of using the catalyst in the comparative example, the conversion rate of NO is 82.4%; while in the case of using any one of the catalysts in Examples 13-15, the conversion rate of NO is higher than 86%, the effect of which is much better than that of the comparative example.

Conclusion: from Examples 1 to 17 and Comparative Examples 1 to 3, it can be seen that the performance of the catalyst of the present disclosure is superior to the catalyst commonly used in the prior art. The specific reasons are as follows.

The present disclosure uses a microwave-absorbing component as one of the catalyst components, which not only can increase the catalytic reaction temperature by means of absorbing microwave energy, but also can decrease the activation energy of the reaction through interaction with the microwave. Generally, the reaction activation energy of catalytic decomposition of nitrogen oxides is in the range from 80 kJ/mol to 100 kJ/mol. However, the reaction activation energy of catalytic decomposition of nitrogen oxides can be decreased to 20 kJ/mol to 25 kJ/mol by using the catalyst of the present disclosure.

The invention claimed is:

1. A microwave catalyst, comprising the following components:
   i) an active catalyst component, comprising a metal and/or a metal oxide, wherein the metal is at least one selected from the group consisting of Cu, Mn, Ce, Ti, V, Mg, and Fe, and the metal oxide is at least one oxide selected from the oxides of Cu, Mn, V, Mg, and Fe;
   ii) a microwave-absorbing component, comprising at least one of CuO, ferrite spinel, and active carbon, wherein the content of CuO as component ii) in the microwave catalyst is in the range from 10% to 70% by mass; and
   iii) a support, which is used to load the active catalyst component and has a porous structure capable of absorbing microwave.

2. The microwave catalyst according to claim 1, wherein the metal is Cu, and the metal oxide is CuO.

3. The microwave catalyst according to claim 1, wherein the support is active carbon and/or a molecular sieve.

4. The microwave catalyst according to claim 3, wherein the molecular sieve is a ZSM-type molecular sieve, Y-type molecular sieve, or β-type molecular sieve.

5. The microwave catalyst according to claim 4, wherein the molecular sieve is a ZSM-5 molecular sieve.

6. The microwave catalyst according to claim 1, wherein the catalyst contains Cu—ZSM-5 or Cu—Y.

7. The microwave catalyst according to claim 5, wherein the content of Cu in Cu—ZSM-5 is in the range from 2% to 12% by mass. oxide in the gas to be processed.

8. The microwave catalyst according to claim 6, wherein the content of Cu in Cu—Y is in the range from 2% to 15% by mass.

9. The microwave catalyst according to claim 1, wherein the content of component i) in the microwave catalyst is in the range from 1% to 35% by mass.

10. The microwave catalyst according to claim 1, wherein the content of the active carbon as component ii) in the microwave catalyst is in the range from 5% to 35% by mass.

11. The microwave catalyst according to claim 10, wherein the content of the active carbom as component II) in the microwave catalyst is in the rage from 15% to 30% by mass.

12. The microwave catalyst according to claim 1, wherein the content of CuO as component II) in the microwave catalyst is in the rage from 30% to 45% by mass.

13. A process for preparing the microwave catalyst according to claim 1, comprising:
   preparing a support loaded with an active component with components i) and iii) by using the ion exchange method, the solid-phase dispersion method, the microwave solid-phase method, or the direct mixing method; and
   preparing the microwave catalyst with the support loaded with an active component and component ii) by precipitation or co-precipitation, or the direct mixing method.

14. A process for removing nitrogen oxide by microwave catalysis using the microwave catalyst according to claim 1, comprising:
   filling the microwave catalyst into the microwave reactor of a microwave device to form a microwave catalytic reaction bed; and
   allowing the gas to be processed to pass through the microwave catalytic reaction bed, with a retention time in the range from 0.2 sec to 5 sec, and at a reaction temperature in the range from 150° C. to 600° C., so as to enable a gas-solid reaction between the gas to be processed and the microwave catalyst, thereby converting the nitrogen oxide into $N_2$ and removing the nitrogen oxide in the gas to be processed.

15. The process for removing nitrogen oxide by microwave catalysis according to claim 14, wherein allowing the gas to be processed to pass through the microwave catalytic reaction bed, with a retention time in the range from 1.5 sec to 4 sec.

* * * * *